US010518777B2

(12) United States Patent
Enthaler et al.

(10) Patent No.: US 10,518,777 B2
(45) Date of Patent: Dec. 31, 2019

(54) METHOD FOR OPERATING A MOTOR VEHICLE, AND MOTOR VEHICLE

(71) Applicant: AUDI AG, Ingolstadt (DE)

(72) Inventors: Achim Enthaler, Ingolstadt (DE); Benjamin Hasmüller, Aichach (DE)

(73) Assignee: AUDI AG, Ingolstadt (DE)

( * ) Notice: Subject to any disclaimer, the term of this patent is extended or adjusted under 35 U.S.C. 154(b) by 38 days.

(21) Appl. No.: 15/564,971

(22) PCT Filed: Mar. 11, 2016

(86) PCT No.: PCT/EP2016/000439
§ 371 (c)(1),
(2) Date: Oct. 6, 2017

(87) PCT Pub. No.: WO2016/162104
PCT Pub. Date: Oct. 13, 2016

(65) Prior Publication Data
US 2018/0072315 A1 Mar. 15, 2018

(30) Foreign Application Priority Data
Apr. 8, 2015 (DE) .......... 10 2015 004 550

(51) Int. Cl.
*B60W 30/18* (2012.01)
*B60W 30/182* (2012.01)
(Continued)

(52) U.S. Cl.
CPC .......... *B60W 30/182* (2013.01); *B60W 30/10* (2013.01); *B60W 50/082* (2013.01);
(Continued)

(58) Field of Classification Search
CPC ................................ B60W 30/182
See application file for complete search history.

(56) References Cited

U.S. PATENT DOCUMENTS 6,385,529 B1 5/2002 Minowa et al.
7,317,973 B2 1/2008 Dieterle
(Continued)

FOREIGN PATENT DOCUMENTS

CN 102910167 A 2/2013
DE 10210546 A1 9/2003
(Continued)

OTHER PUBLICATIONS

English-language abstract of related International Patent Application Publication No. WO 2008/074555 A1, published Jun. 26, 2008; 2 pages.
(Continued)

*Primary Examiner* — Alex C Dunn
(74) *Attorney, Agent, or Firm* — Sterne, Kessler, Goldstein & Fox P.L.L.C.

(57) ABSTRACT

The invention relates to a method for operating a motor vehicle that comprises a navigation device having stored route sections, and a control device for longitudinally and/or transversely guiding the motor vehicle when in an autonomous operating mode, at least one parameter being associated with at least one route section and determining whether said route section is approved for travelling when in the autonomous operating mode, the at least one parameter being retrieved from a server by the navigation device and/or by the control device, by means of a wireless communication connection.

18 Claims, 3 Drawing Sheets

(51) Int. Cl.
  *B60W 50/14* (2012.01)
  *G05D 1/00* (2006.01)
  *B60W 30/10* (2006.01)
  *B60W 50/08* (2012.01)

(52) U.S. Cl.
  CPC .......... *B60W 50/14* (2013.01); *G05D 1/0061* (2013.01); *B60W 2050/146* (2013.01); *B60W 2540/22* (2013.01); *B60W 2550/402* (2013.01); *B60W 2720/10* (2013.01); *B60W 2720/12* (2013.01); *G05D 2201/0213* (2013.01)

(56) References Cited

U.S. PATENT DOCUMENTS

| | | | |
|---|---|---|---|
| 8,751,133 | B2 | 6/2014 | Poulin |
| 8,818,608 | B2 * | 8/2014 | Cullinane ............. B60W 30/00 701/23 |
| 8,825,258 | B2 | 9/2014 | Cullinane et al. |
| 9,346,467 | B2 | 5/2016 | Hahne et al. |
| 9,463,793 | B2 * | 10/2016 | Lind ..................... B60W 30/00 |
| 9,721,468 | B2 | 8/2017 | Giesler et al. |
| 2003/0182026 | A1 | 9/2003 | Awada et al. |
| 2004/0068366 | A1 * | 4/2004 | Nisiyama ........... G01C 21/3461 701/25 |
| 2013/0211656 | A1 * | 8/2013 | An ....................... G05D 1/0221 701/25 |
| 2014/0148988 | A1 * | 5/2014 | Lathrop ................ B60W 50/10 701/23 |
| 2016/0357186 | A1 * | 12/2016 | Dias ..................... G05D 1/0061 |

FOREIGN PATENT DOCUMENTS

| | | |
|---|---|---|
| DE | 69837288 T2 | 11/2007 |
| DE | 102006060316 A1 | 6/2008 |
| DE | 102011077592 A1 | 7/2012 |
| DE | 102012112442 A1 | 6/2014 |
| DE | 102013008605 A1 | 11/2014 |
| DE | 102013225011 A1 | 6/2015 |

OTHER PUBLICATIONS

English-language abstract of German Patent Application Publication No. 10 2011 077 592 A1, published Jul. 19, 2012; 1 page.
English-language abstract of German Patent Application Publication No. 10 2013 225 011 A1, published Jun. 11, 2015; 1 page.
English-language abstract of German Patent Application Publication No. 10 2012 112 442 A1, published Jun. 18, 2014; 1 page.
International Search Report and Written Notice of the International Searching Authority directed to related International Patent Application No. PCT/EP2016/000439, dated May 23, 2016, with attached English-language translation; 18 pages.
International Preliminary Report on Patentability directed to related International Patent Application No. PCT/EP2016/000439, with attached English-language translation, dated Oct. 10, 2017; 11 pages.
Chinese Application No. 201680033271.4 Office Action dated Aug. 27, 2019, with attached English-language translation of First Search; 7 pages.

* cited by examiner

METHOD FOR OPERATING A MOTOR VEHICLE, AND MOTOR VEHICLE

TECHNICAL FIELD

The invention relates to a method for operating a motor vehicle, comprising a navigation device having stored route sections and a control device for longitudinal and/or transverse guidance of the motor vehicle in an autonomous operating mode, wherein at least one parameter is associated with at least one route section, determining whether the route section is approved for operation of the motor vehicle in the autonomous operating mode.

BACKGROUND

There are known vehicles designed for piloted driving and controlled with regard to the longitudinal and/or transverse guidance of the motor vehicle by a control device, for example. During piloted driving, i.e., operation of the vehicle in an autonomous operating mode, the user of the motor vehicle may be engaged in other tasks and/or applications because he is no longer participating in the driving operation of the vehicle. A motor vehicle being operated in an autonomous operating mode is thus a self-driving vehicle. It is possible for such a motor vehicle to be networked optionally unidirectionally or bidirectionally with its surroundings. In particular, the vehicle may have a communication device, which enables communication with a server or with another motor vehicle.

It is also possible for such a motor vehicle, which is designed for operation in an autonomous operating mode, to move without passengers because neither a user nor a driver is needed in the autonomous operating mode.

However, there are locally limited regions, in which operation of motor vehicles in such an autonomous operating mode is undesirable and/or prohibited. Furthermore, special regulations, for example, specific regulations for each country, are in effect for various regions, some of them pertaining specifically to the operation of a motor vehicle in an autonomous operating mode in the respective territory.

DE 698 37 288 T2 describes a vehicle having two switchable operating modes, the first operating mode being an autonomous driving mode, which is carried out only outside of driving mode restricted zones. Before reaching such a restricted zone, the driver is notified of the need for switching the driving mode, so that he can prepare for manual control of the motor vehicle.

This method has the disadvantage that the data pertaining to the restricted zone is stored on a CD ROM (compact disk read only memory). Therefore, this does not allow flexible adjustment of information indicating which regions and/or route sections are approved for driving in the autonomous driving mode.

BRIEF DESCRIPTION OF THE DRAWINGS/FIGURES

DETAILED DESCRIPTION

Figure 1:
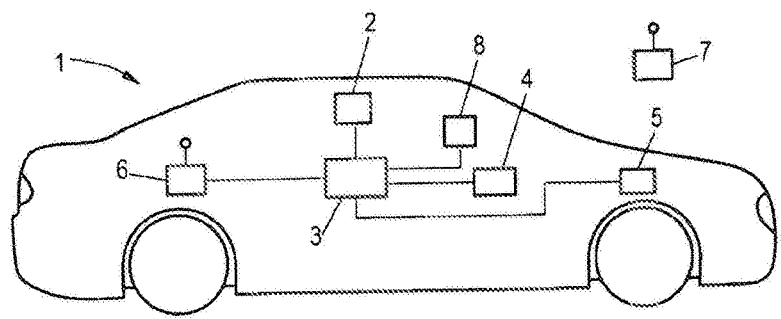
FIG. 1 shows a side view of a motor vehicle according to the invention.

The object of the present invention is therefore to provide an improved method in comparison with this prior art, in which a simplified update of the route sections as well as flexible approval and/or restriction of individual route sections is/are possible.

To achieve this object, in a method of the type according to the invention, it is provided, as defined in the introduction, that the at least one parameter is retrieved from a server by the navigation device and/or by the control device by means of a wireless communication link.

According to the invention, at least one server is provided for storing the at least one parameter determining whether an assigned route section is approved for driving in the autonomous driving mode. The navigation device and/or the control device is/are designed to retrieve the parameter for a corresponding route section from the server via a wireless communication link. It is therefore also possible to update a parameter that has already been retrieved by renewed retrieval. This permits a flexible update of an approval and/or a restriction of a route section.

According to the invention, when planning a route by means of the navigation device, for example, the corresponding route sections that may be required and/or traversed between a starting section and a destination section may be ascertained. According to the route sections thereby ascertained, the parameters associated with the corresponding route sections can be retrieved from the server. Therefore it is possible to determine whether one of the route sections that is to be traversed has not been approved for driving in the autonomous operating mode.

A route section that has not been approved for driving in the autonomous operating mode may be, for example, a safety-relevant region, a temporarily restricted region, a region with a high volume of traffic, a conflict zone, a war zone or other regions where operation of motor vehicles in an autonomous operating mode, i.e., piloted mode, is neither desired nor allowed.

Thus, at least one route section that has not been approved for driving in the autonomous operating mode may be stored, i.e., saved in the navigation device. A parameter determining that this stretch of road is not approved for driving in the autonomous operating mode is associated with this route section accordingly. It is thus impossible to drive on such a restricted route section in an autonomous operating mode. If such a route section is included in the route planned by the navigation device, this necessitates the steps explained below.

It is preferably possible in particular to provide that a warning is output prior to and/or upon reaching a route section not been approved for driving in autonomous operating mode. This warning may be output haptically, e.g., by vibration of at least one part of the motor vehicle, in particular a seat or the steering wheel, or acoustically, e.g., by output of an audio signal by means of at least one output device of the motor vehicle, or visually, e.g., by a display on a display device of the motor vehicle. This has the advantage that the user of the motor vehicle is informed of the fact that a restricted route section approved for driving in the autonomous operating mode is included in the planned route, i.e., the route to be traveled. The warning may preferably be output at a defined distance before reaching the respective route section. This offers the advantage that the warning is output for the user of the motor vehicle at an early point in time, depending on the defined distance, so the driver is informed about the upcoming restricted route section.

In addition, on reaching the respected restricted route section, a warning or a renewed warning may be output. For example, the warning output previously, about how far it is to the restricted route section, for example, may be continued, while it is also possible to output the requirements applicable to the restricted route section. These possible requirements are preferably included in the at least one parameter and are explained in greater detail below. The warning on reaching the restricted route section may preferably include information to the user of the motor vehicle informing the driver of the adjacent restricted route section, preventing further driving of the vehicle in the autonomous operating mode. The user is thus informed in an advantageous manner that it is impossible to continue further in the autonomous operating mode and is preferably also informed about the reason for this and which restrictions, required for driving, on a route section, apply to the respective route section.

A further embodiment of the method according to the invention may consist of the fact that the control device is put in a manual operating mode, in which, at a defined distance before or upon reaching a route section not approved for driving in the autonomous operating mode, the longitudinal and/or transverse guidance of the motor vehicle is controlled completely by the user of the motor vehicle. According to this embodiment of the method according to the invention, the control device is switched from the autonomous operating mode to a manual operating mode. In the manual operating mode, the motor vehicle is controlled by the user of the vehicle. It is thus possible to drive on the restricted route section because the control device transfers the longitudinal and/or transverse guidance entirely to the user during the manual operating mode, in particular the longitudinal and transverse guidance of the motor vehicle. This may take place at a defined interval before or upon reaching the respective route section. The change in operating modes is preferably announced by a warning. For example, the user of the motor vehicle may be informed that a change from the autonomous operating mode to the manual operating mode is necessary at a defined distance from or upon reaching the route section and that the user of the vehicle must thus take over the control of the motor vehicle.

Furthermore, it is possible to provide that the user may consent to this measure or reject it and/or may select one of the other alternative actions as described below.

Alternatively, when carrying out the method according to the invention, it is possible to provide that the control device is switched to an assistance mode at a fixed distance before or upon reaching a route section, which is not approved for driving in the autonomous operating mode. In the assistance mode, the control device supports the user of the motor vehicle in longitudinal and/or transverse guidance of the motor vehicle.

Depending on the parameter associated with the respective route section, which is not approved for driving in an autonomous operating mode, it is possible to provide that only operation of the motor vehicle in the autonomous operating mode is not approved. An assistance mode, in which the control device supports the user of the motor vehicle in the longitudinal and/or transverse guidance of the motor vehicle may thus be permitted, depending on the respective parameter assigned to the section of road. If this is the case, a warning indicating to the user the imminent restricted route section, which is not approved for driving in the autonomous operating mode and also announcing the switching of the control device from the autonomous operating mode to the assistance mode can be output to the user of the motor vehicle before or upon reaching the respective route section. The user is then informed about the fact that he must assume at least partial control of the motor vehicle. It is also possible to provide here that a choice is offered to the user, who can then decide whether to select the assistance mode or one of the other alternatives for action.

At the latest on reaching the corresponding route section, a portion of the control of the motor vehicle may be taken away from the driver in the assistance mode, because the driver is supported by the control device in control of the longitudinal and/or transverse guidance of the motor vehicle.

This alternative method step of the method according to the invention may be improved upon to the extent that the control device in the assistance mode supports the user of the motor vehicle in the longitudinal and/or transverse guidance of the motor vehicle, taking into account the degree of user participation, wherein the degree of user participation defines the degree to which the longitudinal and/or transverse guidance of the motor vehicle is controlled by the user.

This degree of user participation makes it possible to ascertain, for example, to which extent the user controls which function and/or device of the motor vehicle and/or to which extent this function is taken over by the control device. The degree of user participation may preferably be adjusted separately for each function and/or device of the motor vehicle and/or stored in the at least one parameter. The degree of user participation may preferably vary continuously or in fixed increments, for example, in percentage values, from a completely autonomous operating mode to a completely manual operating mode. The degree of user participation can be defined for the longitudinal and/or transverse guidance of the motor vehicle in particular.

It is thus possible for a parameter defining a degree of user participation to be associated with a corresponding restricted route section. On the basis of this degree of user participation, it is thus possible to establish to what extent the user of the motor vehicle must participate in the driving operation in order for that route section to be approved for driving. For example, it may be provided for this purpose that the user of the motor vehicle must keep at least one hand on the steering wheel of the vehicle and/or must leave one hand on the steering wheel only for defined intervals of time, or requirements pertaining to the minimum amount of attention required of the user may be incorporated into the required degree of user participation, so that, for example, the user is not allowed to sleep while driving on that route section in the autonomous operating mode. In particular it is possible to provide that at least one user must be present in the motor vehicle.

Another alternative embodiment of the method according to the invention may provide that the control device of the motor vehicle will put the motor vehicle in a safe condition and will preferably park it at a defined distance outside of or upon reaching a route section not approved for driving in the autonomous operating mode. Then the motor vehicle is moved autonomously by the control device of the motor vehicle up to a defined distance from or until reaching the respective restricted route section and will then put it in a safe condition. The control device will preferably park the motor vehicle, in particular in a manner that is safe with regard to traffic, so that it does not interfere with other traffic participants. This alternative may be provided in particular if the user does not select any other alternative action, so that the motor vehicle is moved by the control device up to a defined distance from or until reaching the route section not approved for driving in the autonomous operating mode. In the safe condition in particular, it is possible to provide that the motor vehicle is secured against rolling away by means of a parking brake and/or the drive device, for example, an internal combustion engine is shut down and/or the motor vehicle is secured against theft.

In addition, as an alternative in the method according to the invention it is possible to provide that at a defined distance before or upon reaching a route section not approve for driving in the autonomous operating mode, the longitudinal and/or transverse guidance of the motor vehicle is continued by the control device on an alternative route section which is approved for driving in the autonomous operating mode. According to this alternative embodiment, it is provided that at a defined distance before or upon reaching a route section that is restricted accordingly, an alternative route is ascertained by means of the navigation device. The alternative route thus includes at least one alternative route section, which is approved for driving in the autonomous operating mode and which replaces the restricted route section that was previously part of the route. The calculation of a new route preferably takes place automatically, so that no route section, whose assigned parameter does not approve of driving in the autonomous operating mode, is included in the route.

Likewise, the user of the motor vehicle may be provided with a choice so that he can decide whether he would like to select another alternative action on reaching the route section that has been restricted accordingly or at a defined distance before reaching that route section or whether the control device and/or the navigation device should continue the autonomous operating mode on the alternative route section. This behavior, which is predetermined on the basis of a user preference, may be incorporated into the control device of the motor vehicle by the user before planning the route.

On reaching the respective route section, it is provided hereby that the motor vehicle will on drive into the restricted route section but instead if necessary on reaching the restricted route section will either turn or be moved by the control device along at least one alternative route section, depending on the alternative route ascertained.

The at least one parameter may relate to at least one legal provision regarding traffic and/or one item of temporary information pertaining to a route section and/or a regulation regarding driver participation in control of the longitudinal and/or transverse guidance of a motor vehicle and/or a degree of user participation. This has the advantage that traffic regulations pertaining to the operation of a motor vehicle in autonomous operating mode can also be queried by a server, so that the control device and/or the navigation device of the motor vehicle is/are always at the updated level. Furthermore, the parameter may relate to temporary information, which in turn relates to a route section. This may be a temporary construction site, for example, and/or a temporary prohibition against driving on the respective route section in the autonomous operating mode. As explained previously, the parameter may also include a degree of user participation which relates to a regulation about driver participation in the control of at least one function and/or a device in the motor vehicle, in particular the control of the longitudinal and/or transverse guidance of the motor vehicle. Therefore, for example, only driving in autonomous operating mode may not be allowed in a certain route section, but operation in an assisted operating mode and/or a defined driver degree of participation may enable the otherwise autonomous operating of the motor vehicle.

The at least one parameter is especially preferably checked for validity by a query of the control device and/or the navigation device by the server permanently or at fixed intervals of time. The parameter may therefore always remain stored in updated form in the control device and/or the navigation device. If it is found that the validity of the at least one parameter has expired, i.e., a more recent version of the parameter is available, this more recent version may of course be retrieved from the server. This ensures that whenever driving on the respective route, each parameter assigned to each route section is at the latest status, and driving on the respective route section is in fact approved or no route sections that are not restricted at the current point in time and/or at the time of driving are disregarded in the planning.

In addition, the invention relates to a motor vehicle comprising a navigation device with route sections stored in the memory and a control device for longitudinal and/or transverse guidance of the motor vehicle in an autonomous operating mode, wherein at least one parameter which defines whether the route section has been approved for operation of the motor vehicle in the autonomous operating mode is assigned to at least one route section. The motor vehicle is therefore designed for carrying out the method according to the invention. In particular a parameter may be retrieved from a server over a wireless communication link by means of the navigation device and/or by means of the control device.

The server from which the navigation device and/or the control device retrieves the at least one parameter via the wireless communication link may be, first of all, a central server where the corresponding parameters assigned to the individual route sections are stored. Furthermore, a regional network of individual servers and/or transmission devices for car-to-car communication and/or infrastructure-to-car communication may be provided, each server covering a certain region and/or a certain number of route sections, preferably in the vicinity of the respective server and/or the respective transmission device. Therefore, it is not necessary to retrieve all the parameters for all the route sections from a central server, but instead the query of parameters may be limited to route sections located in a defined route section, preferably only those route sections situated on the planned route of the motor vehicle. Therefore, each server may preferably be set up at a fixed point, for example, a traffic installation at a major intersection.

It is also possible to handle a wireless communication link from a server via traffic radio by means of which the corresponding parameters are transmitted to the navigation device and/or the control device. This communication link allows only the reception of parameter by the navigation device.

In addition, the invention relates to a motor vehicle comprising a navigation device having saved route sections and a control device for longitudinal and/or transverse guidance of the motor vehicle in an autonomous operating mode, wherein at least one parameter defining whether the route section is approved for driving in the autonomous operating, mode is assigned to at least one route section, such that the navigation device and/or the control device is/are designed to retrieve the at least one parameter via a wireless communication link from at least one server.

All of the advantages, details and features mentioned with regard to the method according to the invention may of course also be applied to the motor vehicle according to the invention.

Figure 2:
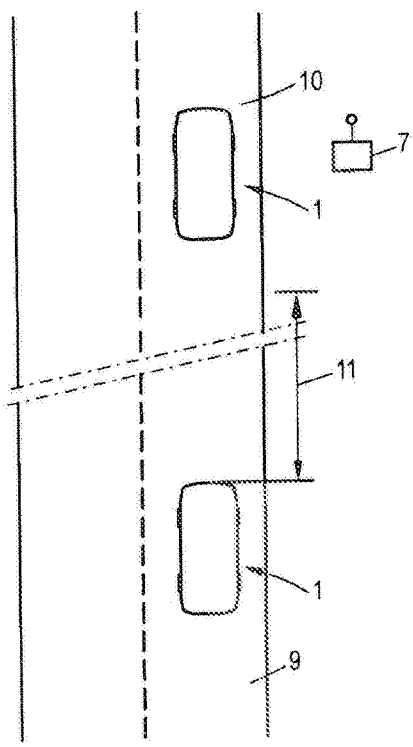
FIG. 2 shows a top view of the motor vehicle from FIG. 1 according to the invention in a first traffic situation.
Figure 3:
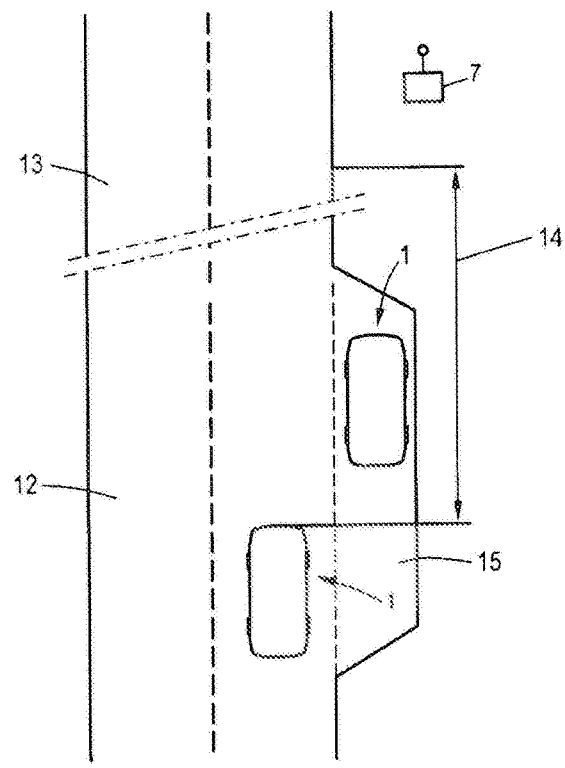
FIG. 3 shows a top view of the motor vehicle from FIG. 1 according to the invention in a second traffic situation.
Figure 4:
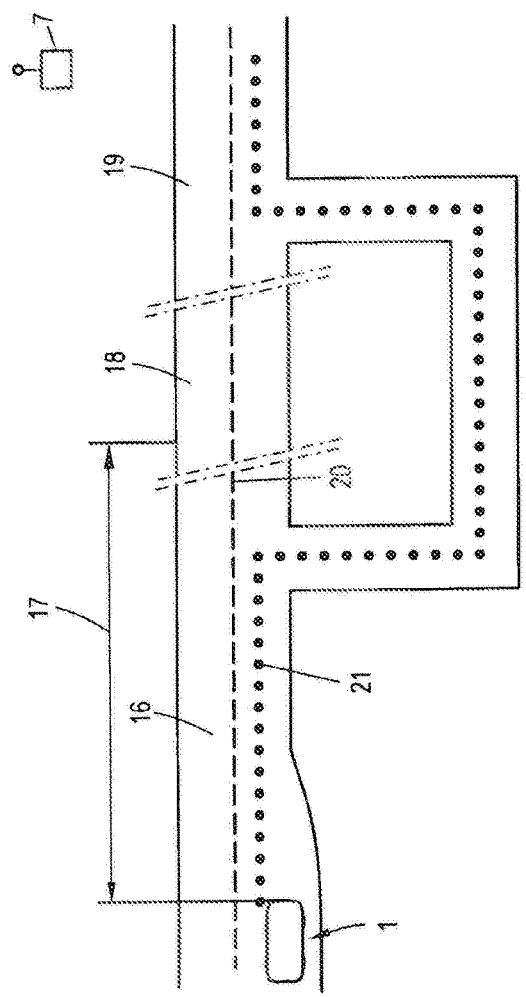
FIG. 4 shows a top view of the motor vehicle from FIG. 1 according to the invention in a third traffic situation.

The invention is explained in greater detail below on the basis of exemplary embodiments with reference to the drawings. The drawings are schematic diagrams in which:

FIG. 1 shows a side view of a motor vehicle according to the invention;

FIG. 2 shows a top view of the motor vehicle from FIG. 1 according to the invention in a first traffic situation;

FIG. 3 shows a top view of the motor vehicle from FIG. 1 according to the invention in a second traffic situation, and FIG. 4 shows a top view of the motor vehicle from FIG. 1 according to the invention in a third traffic situation.

FIG. 1 shows a motor vehicle 1 comprising a navigation device 2 with saved route sections and a control device 3. The control device 3 is designed to control a longitudinal guidance device 4 and a transverse guidance device 5 of the motor vehicle 1. The control device 3 may in particular control autonomously the longitudinal guidance device 4 and the transverse guidance device 5 in an autonomous operating mode, so that the motor vehicle 1 is moved autonomously and therefore is also driven in a piloted mode. A parameter defining whether the given route section is approved for driving in an autonomous operating mode is assigned to each route section. The longitudinal guidance device 4 and the transverse guidance device 5 comprise all the devices and/or functions of the motor vehicle 1 which are necessary for autonomous movement of the motor vehicle 1 and consequently all the components of the motor vehicle 1, which enable piloted driving. The motor vehicle 1 also has a communication device 6 which is designed to establish a wireless communication link to a server 7, which is set up outside of the motor vehicle 1. The at least one parameter may thus be retrieved from the server 7 by the control device 3 via a wireless communication link through the communication device 6. The at least one parameter may then be saved in the navigation device 2.

The motor vehicle 1 also has a display device 8 designed to display information for the user of the motor vehicle 1. In particular a warning may be output by means of the display device 8, indicating that a route section in front of the motor vehicle 1 has not been approved for driving in the autonomous operating mode. According to this embodiment, a corresponding warning is output at a defined distance before reaching the given route section and upon reaching the given route section.

The control device 3 controls the communication device 6 at defined intervals of time so that it establishes a communication link with the external server 7 by means of which the control device 3 can verify the validity of the parameters assigned to the saved route sections. This is preferably accomplished by means of a time stamp which is applied to or assigned to the parameters. If a parameter saved in the navigation device 2 and/or assigned to a given route section saved in the navigation device 2 has an older time stamp than the corresponding parameter saved in the server 7, then the control device 3 will retrieve the corresponding parameter from the server 7 via the communication device 6 and will save it in the navigation device 2. This process takes place to reduce the data volume only for parameters assigned to the route sections to be traversed by the motor vehicle 1 and/or the route planned by the navigation device 2.

FIG. 2 shows a top view of the motor vehicle 1 from FIG. 1 in a first traffic situation. The motor vehicle 1 is situated first on a route section 9 adjacent to a route section 10. The route section 10 is not approved for driving in the autonomous operating mode. Consequently, route section 10 has a parameter that defines the fact that the route section 10 is not approved for driving in autonomous operation. However, the parameter of the route section 9 stipulates that the motor vehicle 1 can drive on the route section 9 in the autonomous operating mode. The motor vehicle 1 is thus controlled by the control device 3 on the route section 9 in the autonomous operating mode.

At a distance 11 between the instantaneous position of the motor vehicle 1 and the route section 10, which is restricted for driving in the autonomous operating mode, a warning is output to the user of the motor vehicle 1 via the display device 8, informing the user that the restricted route section 10 is situated at a distance 11 in front of the motor vehicle 1. On the display device 8, which is designed as a touchscreen according to this embodiment, the user of the motor vehicle 1 can thus select the alternative action which should be carried out by the control device 3. According to the parameter assigned to the given route section 10 and retrieved by the control device 3 from the server 7 via the communication link by means of the communication device 6, it is stipulated that the degree of user participation requires at least partial participation of the user in the driving operation. Consequently, an assistance mode of the control device 3 is thus enabled for driving the route section 10.

The user of the motor vehicle 1 therefore performs a corresponding input on the display device 8 so that, on reaching the route section 10, the control device 3 is converted to the assistance mode. Consequently the control device 3 supports the user of the motor vehicle 1 in controlling the motor vehicle 1. On reaching the route section 10, a warning is then is issued to the user on the display device 8, informing the user that he must now take over the driving operation.

After departing from the route section 10 and/or upon reaching another route section, for which driving in the autonomous operating mode is approved, the control device 3 may again be put in the autonomous operating mode, in which the motor vehicle 1 is driven in piloted mode.

Similarly, in the traffic situation illustrated in FIG. 2, it is possible for the user of the motor vehicle 1 to select on the display device 8 of the motor vehicle 1 the fact that the control device 3 will be switched to the manual operating mode. In the manual operating mode the user takes completes control manually of the motor vehicle 1 and consequently control of the transverse guidance device 5 and the longitudinal guidance device 4. At a distance 11 between the motor vehicle 1 and the given route section 10, it is also displayed to the user here that the given route section 10, where driving in the autonomous operating mode is not approved, is upcoming in front of the motor vehicle 1. The driver then selects the manual operating mode of the control device 3. On reaching the given route section 10, a renewed warning is issued to the user on the display device 8, informing the user that he must now completely assume manual control function of the motor vehicle 1.

FIG. 3 shows the motor vehicle 1 from FIG. 1 in a second traffic situation. The motor vehicle 1 in FIG. 3 is on a route section 12 where driving in the autonomous operating mode is approved. This route section 12 is adjacent to a route section 13, where driving in the autonomous operating mode is not approved. At a distance 14 between the motor vehicle 1 and the given route section 13, a warning for the user of the motor vehicle 1 is displayed on the display device 8 in the manner described above. If the user of the motor vehicle 1 does not respond to this warning, the motor vehicle 1 is, moved by the control device 3 into a parking area 15 on route section 12, outside of route section 13, based on a corresponding control. The motor vehicle 1 is switched to a safe condition and parked by the control device 3 in the parking area 15. In particular the parking brake is activated for this purpose.

This condition is retained until the navigation device 2 has ascertained a route making it unnecessary to drive on the route section 13. It is also possible to wait for input by the user of the motor vehicle 1 as to whether the user desires to revise the route or would like to drive through route section 13 per requirements incorporated into the parameter assigned to route section 13. These requirements may stipulate, for example, manual control of the motor vehicle 1 and/or assisted control of the motor vehicle 1.

FIG. 4 shows the motor vehicle 1 on a route section 16 at a distance 17 from the route section 18 which connected to the route section 16. Driving in autonomous operating mode is approved for the route section 16 but driving in the autonomous operating mode is not approved for the route section 18. The route section 18 is in turn connected to a route section 19 where driving in autonomous operating mode is again approved. It is impossible to drive directly through the route sections 16, 18 and 19, i.e., to reach the route section 19 by the shortest route through the route section 18, in the autonomous operating mode. The parameter assigned to route section 18 includes the information that at least partial participation of the user of motor vehicle 1 in the driving mode is required. However, the motor vehicle 1 is being driven in piloted mode by the control device 3 without a user being in the vehicle 1. It is therefore impossible to satisfy the requirements associated with that parameter. The control device 3 therefore controls the navigation device 2 accordingly, so that the navigation device 2 plans a route 21, which is different from the route 20 running directly through the route sections 16, 18 and 19. Route 20 is illustrated by a dashed line in FIG. 4. Route 21 is in turn illustrated with a dotted line. Route 21 leads from the route section 16 to the route section 22, which permits driving around the restricted route section 18 and thus connects the route section 16 to the route section 19. It is possible in this way to reach route section 19 by driving on route section 22, i.e., continuous driving in autonomous operating mode is possible in this way.

All the aforementioned embodiments may of course be combined with one another in any form. The route sections according to this embodiment represent actual segments of road only schematically and are also to be understood as regions, roads or extensive territories and/or roadway networks. Consequently, this achieves the result that each region for driving in autonomous mode of the motor vehicle is approved, approved with restrictions or approved only for manual operating mode. This is particularly advantageous in achieving the result that the respective parameter is always checked for validity and updated if necessary by a control action by the control device 3 accordingly by means of the communication device 6 which establishes a communication link with the server 7.

The invention claimed is:

1. A method for operating a motor vehicle comprising a navigation device having saved route sections and a control device for longitudinal and/or transverse guidance of the motor vehicle in an autonomous operating mode, the method comprising:
    storing, in the navigation device, at least one route section that is not approved for driving in the autonomous operating mode;
    retrieving, by the navigation device or the control device, at least one parameter from a server via a wireless communication link, wherein the at least one parameter is assigned to the at least one route section and indicates whether the at least one route section is approved for driving in the autonomous operating mode; and
    based on the at least one parameter, and at a defined distance before and/or upon reaching the at least one route section:
        switching the control device to an assistance mode in which the control device supports a user of the motor vehicle in the longitudinal and/or transverse guidance of the motor vehicle, or
        continuing the longitudinal and/or transverse guidance of the motor vehicle in the autonomous operating mode by the control device on an alternative route section that is approved for driving in the autonomous operating mode.

2. The method of claim 1, further comprising:
    outputting a warning before and/or upon reaching the at least one route section.

3. The method of claim 1, wherein the control device supports the user of the motor vehicle in the longitudinal and/or transverse guidance of the motor vehicle in the assistance mode while taking into account a degree of user participation, wherein the degree of user participation defines to what degree the longitudinal and/or transverse guidance of the motor vehicle is controlled by the user of the motor vehicle.

4. The method of claim 3, wherein the degree of user participation defines that the user of the motor vehicle must keep at least one hand on a steering wheel of the motor vehicle.

5. The method of claim 3, wherein the degree of user participation defines a level of attention required of the user of the motor vehicle.

6. The method of claim 3, wherein the degree of user participation defines whether the user of the motor vehicle must be present in the motor vehicle.

7. The method of claim 1, wherein the at least one parameter relates to at least one traffic regulation and/or one item of temporary information pertaining to the at least one route section and/or a regulation about driver participation in controlling the longitudinal and/or transverse guidance of the motor vehicle.

8. The method of claim 1, wherein the at least one parameter is checked for validity constantly or at defined intervals of time by means of a query of the server by the control device and/or by the navigation device.

9. A motor vehicle comprising:
    a navigation device configured to store at least one route section; and
    a control device configured to provide longitudinal and/or transverse guidance of the motor vehicle in an autonomous operating mode;
    wherein a parameter is assigned to the at least one route section and indicates whether the at least one route section is either approved or not approved for driving in the autonomous operating mode;
    wherein the at least one route section stored by the navigation device is not approved for driving in the autonomous operating mode; and
    wherein, at a defined distance before reaching the at least one route section, the control device, based on the parameter, is configured to perform one of:
        either switching to an assistance mode in which the control device assists a user of the motor vehicle in the longitudinal and/or transverse guidance of the motor vehicle; or continuing in the autonomous operating mode by the control device on an alternative route section that is approved for driving in the autonomous operating mode.

10. The motor vehicle of claim 9, further comprising:

a display for outputting a warning before and/or upon reaching the at least one route section.

11. The motor vehicle of claim 9, wherein the control device supports the user of the motor vehicle in the longitudinal and/or transverse guidance of the motor vehicle in the assistance mode while taking into account a degree of user participation, wherein the degree of user participation defines to what degree the longitudinal and/or transverse guidance of the motor vehicle is controlled by the user of the motor vehicle.

12. The motor vehicle of claim 11, wherein the degree of user participation defines that the user of the motor vehicle must keep at least one hand on a steering wheel of the motor vehicle.

13. The motor vehicle of claim 11, wherein the degree of user participation defines a level of attention required of the user of the motor vehicle.

14. The motor vehicle of claim 11, wherein the degree of user participation defines whether the user of the motor vehicle must be present in the motor vehicle.

15. The motor vehicle of claim 9, wherein the parameter relates to at least one traffic regulation and/or one item of temporary information pertaining to the at least one route section and/or a regulation about driver participation in controlling the longitudinal and/or transverse guidance of the motor vehicle.

16. The motor vehicle of claim 9, wherein the parameter is checked for validity constantly or at defined intervals of time by means of a query of a server by the control device and/or by the navigation device.

17. The method of claim 1, wherein the switching the control device to the assistance mode, or the continuing the longitudinal and/or transverse guidance of the motor vehicle by the control device in the autonomous operating mode, is based at least in part upon user input.

18. The motor vehicle of claim 9, wherein, at the defined distance before reaching the at least one route section, the control device configuration for switching to the assistance mode, or for continuing in the autonomous operating mode, is based at least in part upon user input.

* * * * *